United States Patent
Ye et al.

(10) Patent No.: US 9,843,254 B2
(45) Date of Patent: Dec. 12, 2017

(54) HIGH POWER FACTOR POWER CONVERTERS WITH ADAPTIVE OUTPUT VOLTAGE LIMITS FOR FAST DYNAMIC LOAD RESPONSE

(71) Applicant: Dialog Semiconductor Inc., Campbell, CA (US)

(72) Inventors: Zhiqiu Ye, Beijing (CN); Yimin Chen, Campbell, CA (US); Nailong Wang, Beijing (CN)

(73) Assignee: DIALONG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/208,468

(22) Filed: Jul. 12, 2016

(65) Prior Publication Data

US 2017/0012541 A1    Jan. 12, 2017

Related U.S. Application Data

(63) Continuation of application No. PCT/CN2015/083609, filed on Jul. 8, 2015.

(51) Int. Cl.
*H02M 3/335* (2006.01)
*H02M 1/42* (2007.01)
*H02M 1/14* (2006.01)
*H02M 3/156* (2006.01)

(52) U.S. Cl.
CPC ............ *H02M 1/4258* (2013.01); *H02M 1/14* (2013.01); *H02M 1/4208* (2013.01); *H02M 3/33507* (2013.01); *H02M 2003/1566* (2013.01); *Y02B 70/126* (2013.01)

(58) Field of Classification Search
CPC ......... H02M 3/33538; H02M 3/33546; H02M 3/33515; H02M 3/33553; H02M 3/33507; H02M 3/33523

USPC ......... 363/21.04, 21.05, 21.07, 21.08, 21.09, 363/21.11, 21.12, 21.13, 21.15, 21.16, 363/21.17, 21.18
See application file for complete search history.

(56) References Cited

U.S. PATENT DOCUMENTS

| | | | |
|---|---|---|---|
| 2002/0051373 A1 | 5/2002 | Lipcsei | |
| 2013/0201729 A1* | 8/2013 | Ahsanuzzaman . | H02M 3/33507 363/21.12 |
| 2014/0268950 A1* | 9/2014 | Medina-Garcia . | H02M 3/33507 363/78 |
| 2014/0292295 A1 | 10/2014 | Lee et al. | |

(Continued)

FOREIGN PATENT DOCUMENTS

| | | |
|---|---|---|
| CN | 101499717 A | 8/2009 |
| CN | 102545636 A | 7/2012 |

(Continued)

OTHER PUBLICATIONS

PCT Search Report and Written Opinion dated Mar. 24, 2016 from corresponding International Application No. PCT/CN2015/083609.

*Primary Examiner* — Timothy J Dole
*Assistant Examiner* — Bryan R Perez
(74) *Attorney, Agent, or Firm* — Haynes and Boone, LLP

(57) ABSTRACT

A switching power converter is provided that switches between low-bandwidth PI control and a high-speed control of an output voltage responsive to comparing the output voltage to an upper output voltage limit and to a lower output voltage limit. The switching power converter adapts the upper and lower voltage limits responsive to a load demand.

20 Claims, 6 Drawing Sheets

(56) References Cited

U.S. PATENT DOCUMENTS

2015/0180341 A1\* 6/2015 Yuan ................. H02M 3/156
  323/271
2016/0294278 A1\* 10/2016 Li .................... H02M 3/156

FOREIGN PATENT DOCUMENTS

| CN | 102594146 A | 7/2012 |
| CN | 104167923 A | 11/2014 |

\* cited by examiner

HIGH POWER FACTOR POWER CONVERTERS WITH ADAPTIVE OUTPUT VOLTAGE LIMITS FOR FAST DYNAMIC LOAD RESPONSE

CROSS-REFERENCE TO RELATED APPLICATIONS

This matter is a continuation of International Application No. PCT/CN2015/083609, filed Jul. 8, 2015.

TECHNICAL FIELD

This application relates to switching power converters, and more particularly to a switching power converter with adaptive output voltage limits.

BACKGROUND

Single-stage AC-DC power conversion is a low cost and thus popular power supply topology. An important parameter for a single-stage AC-DC power switching converter is its power factor, which is the ratio of the real power delivered by the AC main to the single-stage AC-DC switching power converter as compared to the apparent power delivered to the single-stage AC-DC switching power converter. The apparent power is insensitive to the phasing between the input current and voltage in contrast to the real power. The power factor is thus lowered if the input current and voltage are out of phase. The rectified input voltage to a single-stage AC-DC switching power converter cycles from approximately zero volts to the peak line voltage (e.g., 120 V*1.414 in the US) at twice the frequency for the AC main. Given this sinusoidal pulsing or cycling of the rectified input voltage, the input current should have a similar profile to achieve a high power factor such as by the use of a suitable peak current or constant on time control methodology.

Although single-stage AC-DC power conversion can thus provide a high power factor, the shaping of the input current to match the rectified input voltage cycling causes the output voltage to ripple about some nominal output value. Should the control loop in a single-stage AC-DC switching power converter have a bandwidth greater than twice the AC main frequency, it would act to suppress this output voltage ripple. But in that case, the power factor would drop as the input current would no longer have the same rectified sinusoidal profile as for the rectified input voltage. The bandwidth for the control loop in a single-stage AC-DC switching power converter must thus be less than twice the line frequency to achieve a high power factor. The resulting control loop is typically implemented using a proportional-integral (PI) controller.

The relatively slow response speed of the PI controller is problematic, however, with regard to responding to load transients. For example, the load may suddenly increase from a relatively light demand to a relatively high demand for power. Conversely, a high demand may suddenly change to a low demand of power at the load. To accommodate these transient changes, it is conventional to compare the output voltage to an upper output voltage limit as well as to a lower output voltage limit. The output voltage limits may also be denoted as output voltage thresholds. Should the output voltage feedback signal indicate that the output voltage has dipped below the lower output voltage limit or risen above the upper output voltage limit, the controller response speed is significantly increased. For example, a maximum switch on time may be used for each power switch cycle if the lower output voltage limit is crossed. Similarly, a minimum on time for the each power switch cycle may be used if the upper output voltage limit is exceeded. After the output voltage recovers so that the output voltage feedback signal lies between the upper and lower voltage limits, the low-bandwidth PI control may resume.

Although the change in control using the upper and lower voltage limit thus accommodates load transients in single-stage high PFC AC-DC power converters, the output voltage will tend to undershoot the lower output voltage limit and overshoot the upper output voltage limit. For example, the output voltage for a conventional high PFC AC-DC power converter is shown in FIG. 1 for an initial light load current followed by the sudden demand for a heavy load current. The upper and lower limits for the output voltage must provide a sufficient margin for normal operation during the heavy load period. For example, it is conventional that the margin between the peak output voltage and the upper output voltage limit be at least 5% of the nominal output voltage (the DC average for the output voltage). Similarly, it is conventional that the margin between the minimum output voltage and the lower output voltage limit be at least 5% of the nominal output voltage. During heavy load operation, the output voltage ripple itself may be 5% of the nominal output voltage. But during light load operation, the output ripple is significantly less than the 5% ripple seen during heavy load operation. The margin between the lower output voltage limit and the minimum value for Vout during low load operation will thus be significant. When Vout changes due to the application of a heavy load, Vout thus tends to undershoot the lower output voltage limit. At this point, regular PI control is stopped so that the maximum power cycles (or an increase in response gain) may be applied as discussed above. The output voltage will eventually recover, whereupon regular PI control may resume. This undershoot is problematic as the output voltage is swinging below its desired minimum value.

Accordingly, there is a need in the art for improved transient response for single-stage AC-DC power converters.

SUMMARY

A single-stage switching power converter is provided that adaptively changes the upper output voltage limit and the lower output voltage limit used to distinguish between low-bandwidth PI control and high-speed control of the output voltage. The resulting adaptive output voltage limits alleviate the output voltage undershoot and overshoots issues suffered by conventional high power factor single-stage AC-DC power converters.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need for improved transient response in single-stage AC-DC switching power converters, the upper and lower output voltage limits that trigger a transition from a low-bandwidth control to a fast response control are adaptively determined with regard to the current output voltage ripple. In this fashion, the upper and lower output voltage limits will depend upon the current load conditions. During periods in which the output current demand is light, the output voltage ripple about its nominal value is relatively small. The single-state AC-DC switching power converter controller disclosed herein responds to this reduced output voltage ripple by reducing the upper output voltage limit as compared to the upper output voltage limit used during a period of high output current demand. Similarly, the controller adaptively increases the lower output voltage limit during periods of light load as compared to the lower output voltage limit used during a heavy load condition.

Figure 1:
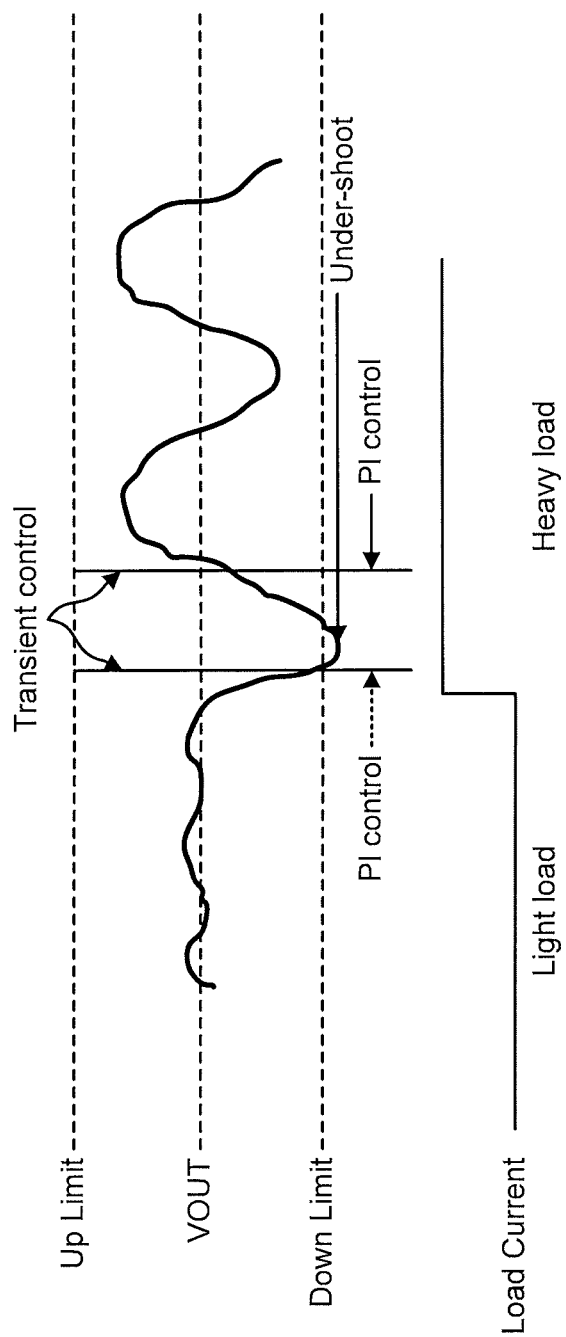
FIG. 1 illustrates the output voltage waveform for a prior art single-stage AC-DC power converter as compared to its upper and lower output voltage limits for switching between regular PI control and increased response speed in response to a low load current conditioning transitioning quickly into a heavy load current.
Figure 2:
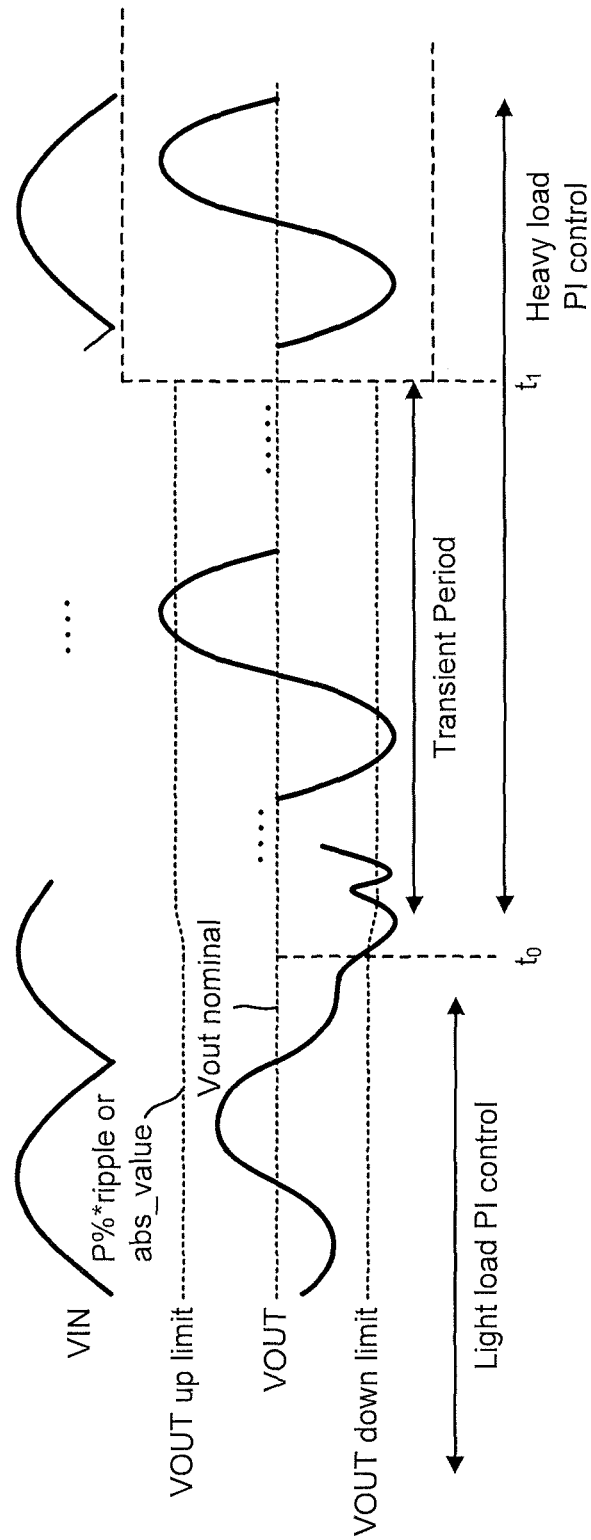
FIG. 2 illustrates the output voltage waveform as compared to its adaptive upper and lower output voltage limits for switching between low-bandwidth PI control and a fast response mode for a rapid change from a low load condition to a high load condition in accordance with an embodiment of the disclosure.

During periods of heavy load, the output voltage ripple increases with regard to the nominal value (the average DC value) of the output voltage. The upper output voltage limit is thus increased responsive to this increased output voltage ripple. Similarly, the lower output voltage limit is reduced responsive to the increased output voltage ripple. Given this adaptation of the output voltage limits to the current load demand, the controller may more rapidly respond to either an under voltage or over voltage condition. For example, FIG. 2 shows the output voltage waveform as the load changes suddenly from a steady-state period of low load demand to a period of high load demand. Because of the reduced output voltage ripple with respect to the nominal output voltage during the light load condition, the separation or margin between the upper output voltage limit and the nominal output voltage is reduced during the light load condition due to the adaptation of the upper output voltage limit as compared to the margin used during the high load period. Similarly, the margin between the lower output voltage limit and the nominal output voltage is adaptively reduced during the light load condition as compared to the margin used during the high load period. At a time t0, the load changes suddenly to a heavy load condition such that the output voltage is pulled below the lower output voltage limit. The control methodology may then be changed from a conventional low-speed PI control to a high-speed control such as by cycling the power switch using a maximum on time. Alternatively, PI control may be maintained but at a sufficiently increased gain so as to respond sufficiently to the under-voltage condition. If the cycling of the power switch during the high-speed control mode is saturated at its maximum on time, the high-speed control mode may also be denoted as an open loop control mode since the on time is not varied. Alternatively, the switching frequency may be increased during the high-speed control mode. The high-speed control mode may continue until the output voltage rises sufficiently above the lower output voltage limit, whereupon a "medium" gain PI control mode may ensue that has a response speed greater than the low-speed PI control mode and less than the high-speed control mode. To determine when the transient change in the output voltage has subsided, the controller may count the number of times the output voltage crosses the nominal output voltage value subsequent to the start of the transient period at time to. After a sufficient number of crossings of the nominal output voltage value, the controller may determine that the transient period for the output voltage has ended at a time t1. If the nominal voltage crossings occur at twice the line frequency, it may be presumed that the transient period has ended at time t1, whereupon the low-bandwidth PI control mode may resume. During the transient period, the controller may adapt the voltage limits but the voltage limits are not used during the transient period with regard to detecting an over-voltage or under-voltage condition. Due to the increased load, the upper output voltage limit subsequent to the end of the transient period at time t1 is greater as compared to the upper output voltage limit used during the light load condition. Similarly, the lower output voltage limit is reduced as compared to the lower output voltage limit used during the light load condition. The resulting output voltage limit adaptation is quite advantageous because the under-voltage condition may be detected more quickly and responded to more quickly by instituting the high-speed control as compared to conventional controllers. The output voltage is thus better regulated with regard to the desired nominal value due to the adaptation of the upper and lower output voltage limits.

Figure 3:
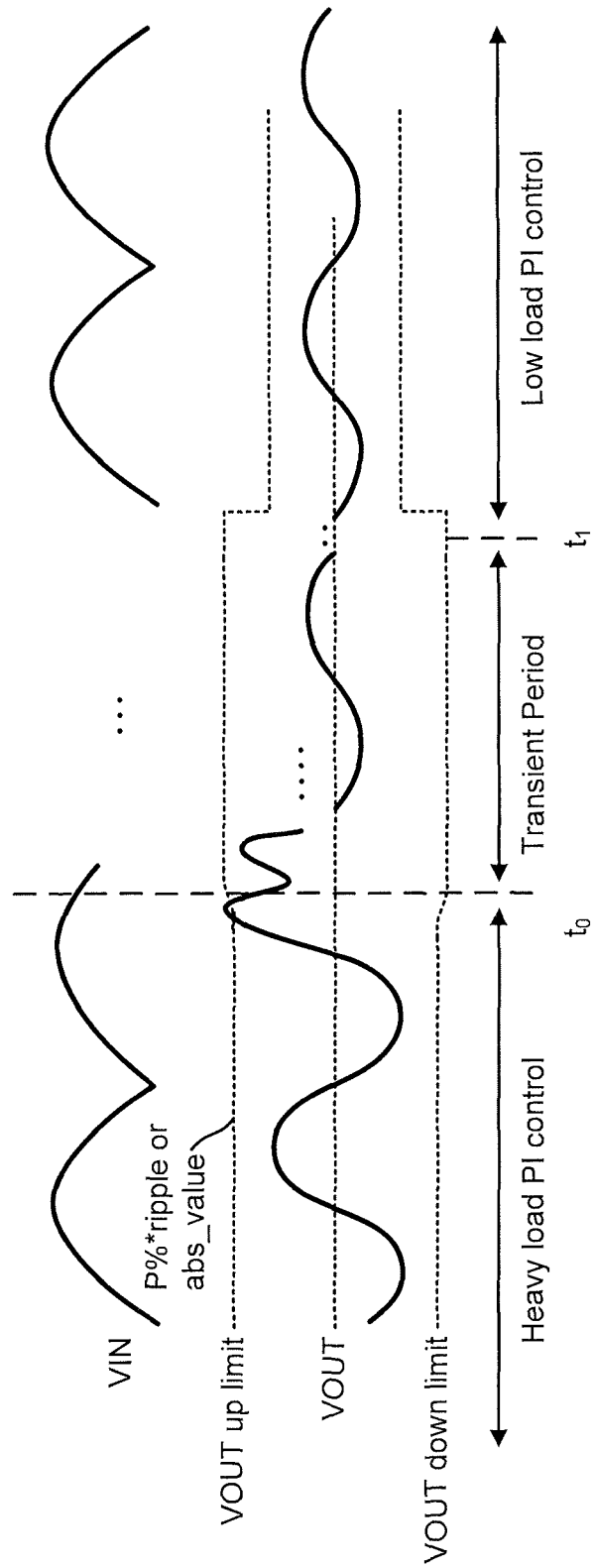
FIG. 3 illustrates the output voltage waveform as compared to its adaptive upper and lower output voltage limits for switching between low-bandwidth PI control and a fast response mode for a transient change from a high load condition to a low load condition in accordance with an embodiment of the disclosure.

A similar adaptation occurs for a sudden or transient transition from a steady-state heavy load condition to a low load condition as shown in FIG. 3. During the steady-state heavy load condition, the output voltage ripple is relatively large so the adaptation of the output voltage limits increases the margin for the limits from the nominal output voltage. At a time t0, the load demand suddenly transitions into a period of light demand. The upper output voltage limit is then violated as the output voltage rises accordingly in that the relatively slow PI control during the period of heavy demand cannot respond to the sudden reduction in load demand. A high-speed control mode then ensues during the subsequent transient period in which the controller may count the number of nominal output voltage crossings by the output voltage to determine an end to the transient period at a time t1. As described with regard to the light-to-heavy load transition of FIG. 2, the controller may switch to a medium-speed control mode when the output voltage has sufficiently recovered for the duration of the transient period. The controller may adapt the output voltage limits during the transient period to reduce the margin between the limits and the nominal output. The reduced-margin output voltage limits when low-bandwidth PI control resumes subsequent to the end of the transient period at time t1. In this fashion, the controller may quickly respond to a subsequent application of a heavy load as discussed with regard to FIG. 2.

Figure 4:
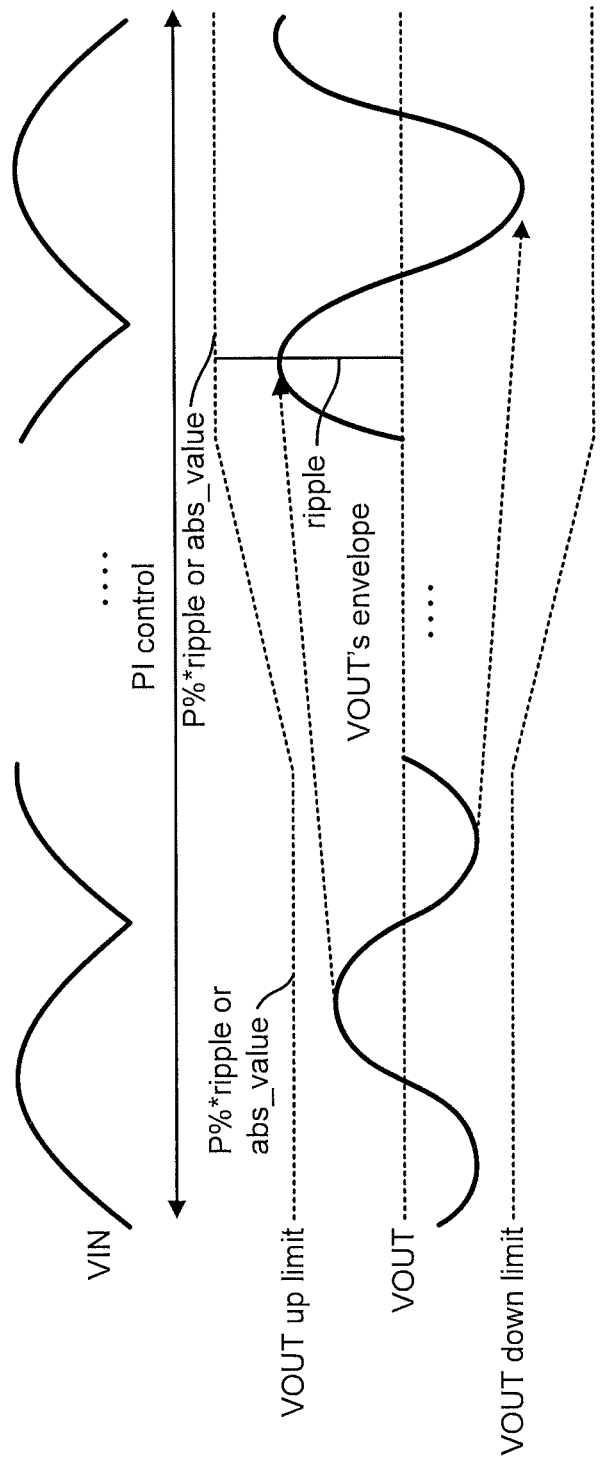
FIG. 4 illustrates the output voltage waveform as compared to its adaptive upper and lower output voltage limits for switching between low-bandwidth PI control and a fast response mode for a gradual change from a low load condition to a high load condition in accordance with an embodiment of the disclosure.

Should there be no sudden changes in load demand, the controller may gradually adapt the output voltage limits as shown in FIG. 4 for a gradual transition from a period of light load demand to a period of heavier load demand. Since the output voltage never violates the output voltage limits due to this gradual change in load demand, the high-speed control mode is not invoked. An example controller embodiment will now be discussed.

Figure 5:
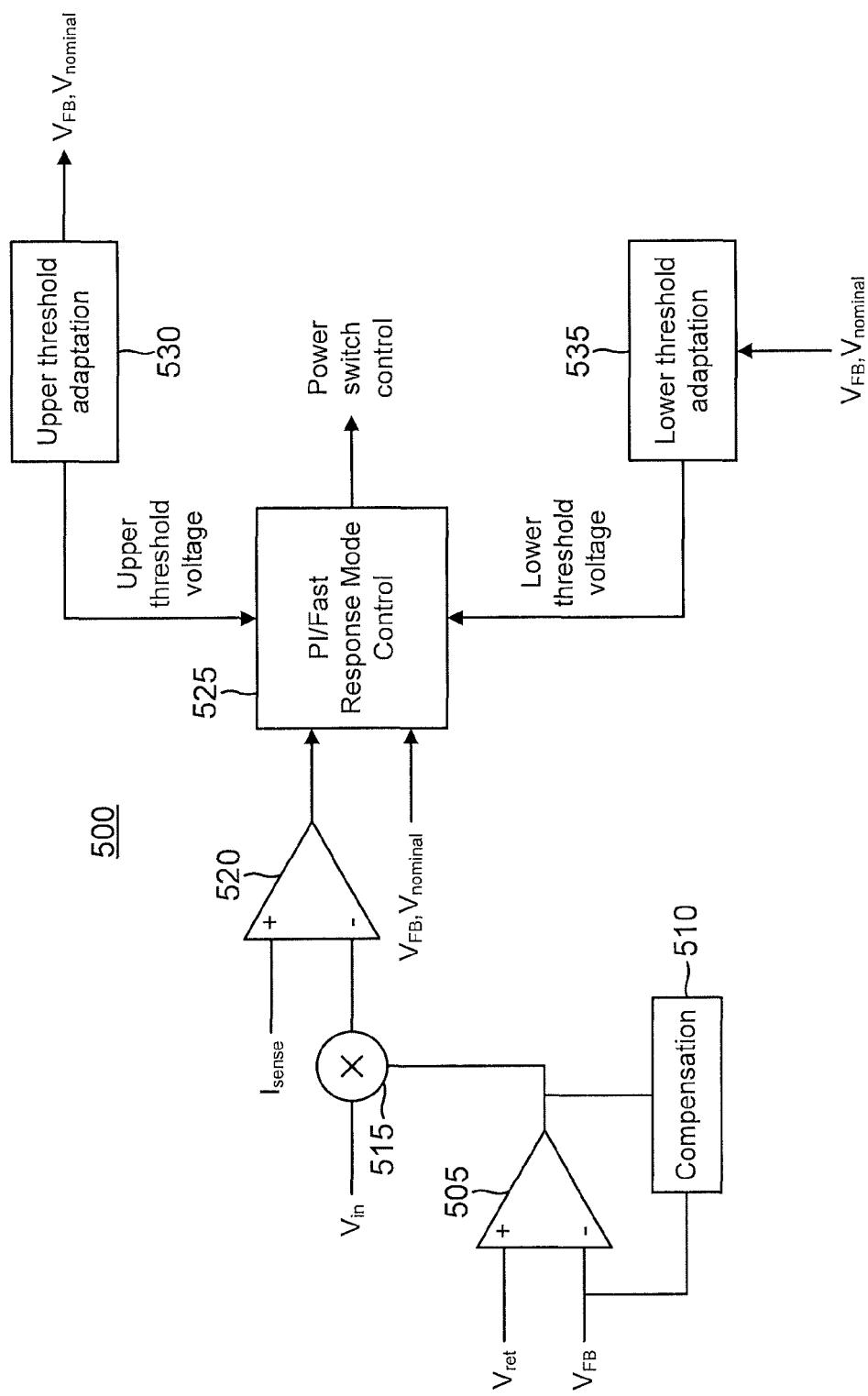
FIG. 5 is a diagram of a controller configured to adapt the upper and lower output voltage limits in accordance with an embodiment of the disclosure.

FIG. 5 shows an example controller 500. In this embodiment, controller 500 is a peak-current-mode controller but it will be appreciated that the output voltage limit adaptation discussed herein may also be implemented in a constant on time controller. A feedback voltage ($V_{FB}$) representative of the output voltage is compared to a reference voltage at a comparator 505 to produce an error signal. A compensation filter 510 may compensate the error signal as known in the high power factor controller arts. A multiplier 515 multiplies the error signal with a signal representative of the rectified input voltage Vin to produce a multiplied error signal. The rectified input voltage cycles at twice the frequency of the AC main (not illustrated). A comparator 520 compares the multiplied error signal to an Isense signal representative of the input current to the AC-DC switching power converter controlled by controller 500. During low-bandwidth PI control, comparator 520 switches off the power switch (not illustrated) in each power switch cycle when Isense exceeds the multiplied error signal. The multiplied error signal thus determines the desired peak input current to the AC-DC switching power converter. Since this desired peak input current is modulated according to the cycling of the rectified input voltage, the resulting low-bandwidth PI control provides a high power factor.

A mode control circuit 525 compares the output voltage (as represented by $V_{FB}$) to an upper output voltage limit and to a lower output voltage limit. If the output voltage lies between the upper output voltage limit and the lower output voltage limit, comparator 520 controls the power switch cycling as discussed above. In an over-voltage condition in which the output voltage exceeds the upper output voltage limit, mode control circuit 525 controls the power switch cycling using a fast mode control. Similarly, mode control circuit 525 invokes the fast mode control responsive to an under-voltage condition in which the output voltage dips below the lower output voltage limit. Mode control based on a comparison of the output voltage to upper and lower output voltage limits is conventional. To alleviate the undershoot and overshoot problems associated with such conventional control, controller 500 includes an upper output voltage limit adaptation circuit 530 that adaptively changes the upper output voltage limit based upon the output voltage ripple as compared to the nominal output voltage.

Upper output voltage limit adaptation circuit 530 may be configured to use either a percentage of the output voltage ripple or may simply add a voltage offset to the peak output voltage to generate the upper output voltage limit. Alternatively, upper output voltage limit adaptation circuit 530 may use both techniques in parallel and use either the resulting minimum or maximum value. The adaptation may be performed using ether digital or analog circuitry. To provide smoothing, upper output voltage limit adaptation circuit 530 may low pass filter the upper output voltage limit adaptation. A lower output voltage limit adaptation circuit 535 adapts the lower output voltage limit analogously as discussed with regard to upper output voltage limit adaptation circuit 530. Circuits 530 and 535 may be configured to clamp the adaptation (prevent further changes in the upper and lower output voltage limits) at some maximum load demand condition.

Figure 6:
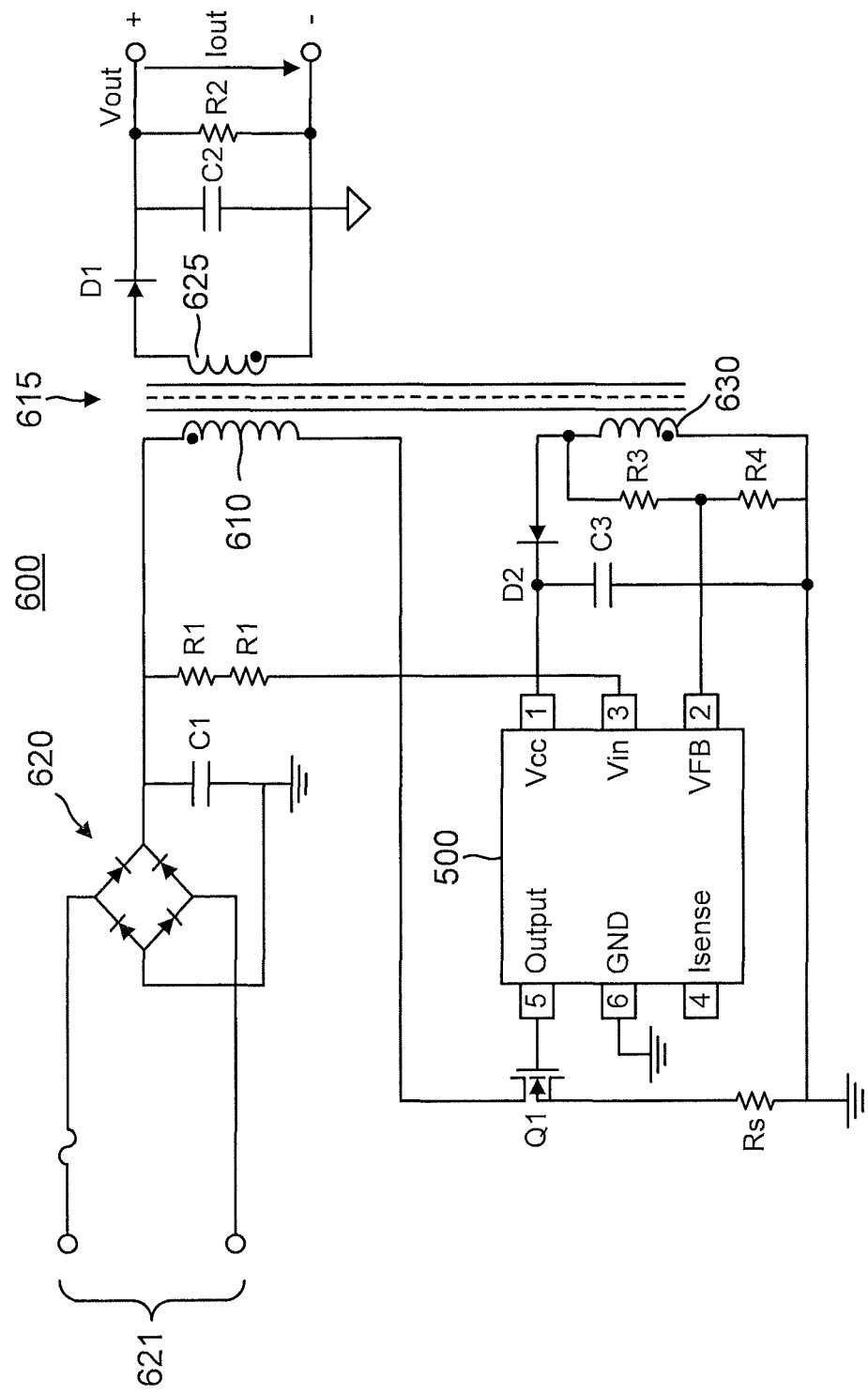
FIG. 6 is a diagram of a flyback converter including the controller of FIG. 5 in accordance with an embodiment of the disclosure.

The resulting output voltage limit adaptation may be practiced in any suitable high power factor AC-DC switching power converter topology including buck converters and boost converters. An example flyback converter 600 including controller 500 is shown in FIG. 6. Controller 500 controls the switching of a power switch such as an NMOS transistor Q1 by driving its gate through an output pin 5. In alternative embodiments, the power switch may be implemented using a bipolar junction transistor. When switched on, power switch transistor Q1 allows a primary current to flow through a primary winding 610 of a transformer 615 responsive to the rectified input voltage Vin. A rectifier 620 including a diode bridge and a capacitor C1 rectifies the alternating line voltage carried on an AC main 621 to provide the rectified input voltage Vin. The rectified input voltage Vin thus still retains a pronounced sinusoidal profile across each half of an AC main cycle.

For each cycle of power switch transistor Q1, the primary winding current ramps up from zero to a peak winding current value that depends upon the input voltage Vin, the switch on time, and the inductance for primary winding 610. When power switch transistor Q1 cycles off, a secondary winding current flows across a second winding 625 in transformer 615, starting from a peak value and continuing to ramp down to zero. An output capacitor C2 stabilizes a resulting output voltage Vout produced by the second winding current. A diode D1 prevents the secondary winding current from flowing while the primary winding conducts. Alternatively, diode D1 may be replaced by a transistor switch as is conventional for a flyback converter with synchronous rectification. The secondary winding current produces a reflected voltage across primary winding 610 and also across an auxiliary winding 630 for transformer 615. Diode D1 will have a voltage drop across it that prevents a direct relationship between the reflected voltage and the output voltage while the secondary current still flows. But when the secondary current ramps to zero (the transformer reset time), there is no voltage drop across diode D1 such the resulting reflected voltage at that time is directly related to the output voltage. By indirectly sampling the output voltage at this transformer reset time, controller 500 performs primary-only feedback control of the output voltage. For example, controller 500 may include a $V_{FB}$ pin 2 that samples the reflected voltage across auxiliary winding 630 through a voltage divider formed by a pair of resistors R3 and R4. The reflected voltage may also be rectified through a diode D2 and a capacitor C3 to form a power supply voltage VCC received by controller 205 at a power pin 1. Controller 500 may include a ground pin 6 and a current sense (Isense) pin 4 that samples the primary winding current through the voltage produced across a sampling resistor Rs coupled to a source of power switch transistor Q1. The resulting adaption of the upper and lower output voltage limits by controller 500 alleviates the conventional undershoot and overshoot of the output voltage in flyback converter 600.

In addition to alleviating the undershoot and overshoot problems, the adaptive output voltage limits disclosed herein also address the aging of output capacitor C2, which typically must have a relatively large capacitance to ensure stable steady-state operation. To provide sufficient capacitance at low cost, it is conventional to implement output capacitor C2 using an electrolytic capacitor. But the capacitance of an electrolytic capacitor gradually decreases during its lifetime. The output voltage ripple will thus gradually increase during the electrolytic capacitor lifetime. Referring again to FIG. 4, the slow increase in the output voltage ripple is problematic in that the conventional fixed upper and lower output voltage limits will eventually be violated by the increased output voltage ripple, whereupon normal operation is no longer stable. To prolong the expected lifetime, manufacturers are thus forced to increase the capacitance of the electrolytic output capacitor, which increases costs. But the adaptation disclosed herein not only enables the use of less expensive output capacitors having reduced capacitance but also advantageous adapts to the increased output voltage ripple over the output capacitor lifetime.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A system; comprising:
   a controller for controlling a cycling of a power switch in a switching power converter to regulate an output voltage to a nominal value;
   an upper threshold voltage adaptation circuit configured to increase an upper threshold voltage responsive to an increase in a voltage ripple between the output voltage and the nominal value, wherein the upper threshold voltage adaptation circuit is further configured to decrease the upper threshold voltage responsive to a decrease in the voltage ripple;
   a lower threshold voltage adaptation circuit configured to decrease a lower threshold voltage responsive to the increase in the voltage ripple, wherein the lower threshold voltage adaptation circuit is further configured to increase the lower threshold voltage responsive to a decrease in the voltage ripple; and
   a mode control circuit configured to allow the controller to control the cycling of the power switch when an output voltage for the switching power converter is both less than the upper threshold voltage and greater than the lower threshold voltage and to prevent the controller from controlling the cycling of the power switch when the output voltage is greater than the upper threshold voltage or less than the lower threshold voltage.

2. The system of claim 1, wherein the controller is a peak-current-mode controller.

3. The system of claim 2, wherein the upper threshold voltage adaptation circuit is configured to increase the upper threshold voltage through the use of a percentage of the voltage ripple, and wherein the upper threshold voltage adaptation circuit is further configured to add the percentage to a peak value for the output voltage to increase the upper threshold voltage.

4. The system of claim 2, wherein the lower threshold voltage adaptation circuit is configured to decrease the lower threshold voltage through the use of a percentage of the voltage, and wherein the lower threshold voltage adaptation circuit is further configured to subtract the percentage from a minimum value for the output voltage to decrease the lower threshold voltage.

5. The system of claim 2, wherein the upper threshold voltage adaptation circuit is configured to increase the upper threshold voltage through an addition of an offset value to a peak value for the output voltage to increase the upper threshold voltage.

6. The system of claim 2, wherein the lower threshold voltage adaptation circuit is configured to decrease the lower threshold voltage through a subtraction of an offset value from a minimum value for the output voltage to decrease the threshold voltage.

7. The circuit of system 2, wherein the peak-current-mode controller includes a comparator to generate a switch off command responsive to a comparison of a multiplied error signal with an Isense signal representative of an input current to an AC-DC power converter.

8. The system of claim 7, wherein the AC-DC power converter is a flyback converter.

9. The system of claim 1, wherein the controller is a constant on time controller.

10. The system of claim 1, wherein the upper threshold voltage adaptation circuit and the lower threshold voltage adaptation circuit are configured such that a separation between the upper threshold voltage and the lower threshold voltage is reduced during a period of low voltage ripple and is increased during a period of high voltage ripple.

11. The system of claim 1, wherein the mode control circuit is configured to command the power switch to use a maximum on time when the output voltage is less than the lower threshold voltage and to use a minimum on time when the output voltage is greater than the upper threshold voltage.

12. A method of controlling a switching power converter, comprising:
   adapting a separation between an upper threshold voltage and a lower threshold voltage so that the separation increases in response to an increase in a voltage ripple between an output voltage for the switching power converter and a nominal value for the output voltage and so that the separation decreases in response to a decrease in the voltage ripple; and
   cycling a power switch for a switching power converter using proportional-integral (PI) control while the output voltage is both less than the upper threshold voltage and greater than the a lower threshold voltage.

13. The method of claim 12, wherein adapting the separation is responsive to a percentage of the voltage ripple.

14. The method of claim 12, wherein adapting the separation is responsive to a peak value for the output voltage and to a minimum value for the output voltage.

15. The method of claim 12, further comprising:
   cycling the power switch using a maximum on time when the output voltage falls below the lower threshold voltage.

16. The method of claim 12, further comprising using a maximum switching frequency when the output voltage falls below the lower threshold voltage.

17. The method of claim 12, further comprising:
   cycling the power switch using a minimum on time when the output voltage is greater than the upper threshold voltage.

18. The method of claim 12, further comprising using a minimum switching frequency in response to the output voltage being greater than the upper threshold voltage.

19. The method of claim 12, further comprising clamping the adaptation of the separation for a maximum load condition.

20. The method of claim 12, wherein adapting the separation comprises adding a voltage offset to a peak value for the output voltage to determine the upper threshold voltage and subtracting the voltage offset from a minimum value for the output voltage to determine the lower threshold voltage.

* * * * *